United States Patent
Bala

(10) Patent No.: US 12,449,865 B2
(45) Date of Patent: Oct. 21, 2025

(54) LATCHING ASSEMBLY FOR A HANDLE OF A DRIVE CARRIER

(71) Applicant: HEWLETT PACKARD ENTERPRISE DEVELOPMENT LP, Spring, TX (US)

(72) Inventor: Sunil Rao Ganta Papa Rao Bala, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 303 days.

(21) Appl. No.: 18/161,338

(22) Filed: Jan. 30, 2023

(65) Prior Publication Data

US 2024/0256009 A1    Aug. 1, 2024

(51) Int. Cl.
*G06F 1/18* (2006.01)
*G11B 33/12* (2006.01)
*H05K 7/14* (2006.01)

(52) U.S. Cl.
CPC ............ *G06F 1/187* (2013.01); *G11B 33/124* (2013.01); *H05K 7/1409* (2013.01)

(58) Field of Classification Search
CPC ...... G06F 1/187; G11B 33/124; H05K 7/1409
See application file for complete search history.

(56) References Cited

U.S. PATENT DOCUMENTS

| | | | | |
|---|---|---|---|---|
| 6,560,098 B1 * | 5/2003 | Beinor, Jr. | ........... | G11B 33/128 361/752 |
| 6,798,650 B2 * | 9/2004 | Reznikov | ............. | G11B 33/122 D14/363 |
| 7,480,137 B1 * | 1/2009 | Jyh | ...................... | E05B 73/0082 29/737 |
| 7,511,953 B2 | 3/2009 | Tao et al. | | |
| 7,684,182 B2 * | 3/2010 | Zhang | ..................... | G06F 1/187 360/264.2 |
| 7,701,703 B2 * | 4/2010 | Peng | .................... | G11B 33/124 248/633 |
| 7,782,606 B2 * | 8/2010 | Baker | ................. | G11B 33/124 361/679.33 |
| 7,791,871 B2 * | 9/2010 | Peng | ....................... | G06F 1/187 361/679.33 |
| 7,808,777 B2 * | 10/2010 | Luo | ....................... | G11B 33/127 248/316.1 |
| 7,848,099 B1 * | 12/2010 | Zhang | ................. | G11B 33/124 439/327 |

(Continued)

*Primary Examiner* — Adrian S Wilson
(74) *Attorney, Agent, or Firm* — Hewlett Packard Enterprise Patent Department

(57) ABSTRACT

A drive carrier includes a frame to receive and carry a media drive, a handle assembly, and a latching assembly having a helical compression spring and a latch. The handle assembly having a handle is pivotably connected to the frame and configured to rotate relative to the frame between open and closed positions. The handle assembly in its closed position, is configured to engage to a drive cage and hold the drive carrier in the drive cage. The latch is pivotably connected to the frame and rotatable between latched and unlatched positions. A second locking arm of the latch in its latched position, is engageable with a first locking arm of the handle to retain the handle in the closed position. The helical compression spring is arranged at an acute angle relative to the frame and applies force on the latch to bias the latch towards the latched position.

18 Claims, 10 Drawing Sheets

(56) References Cited

U.S. PATENT DOCUMENTS

| | | | |
|---|---|---|---|
| 7,864,522 B1 * | 1/2011 | Peng | G11B 33/124 |
| | | | 439/327 |
| 7,974,088 B2 * | 7/2011 | Li | G06F 1/187 |
| | | | 361/679.33 |
| 8,023,263 B2 * | 9/2011 | Crippen | G06F 1/187 |
| | | | 361/679.33 |
| 8,050,027 B2 * | 11/2011 | Liang | G06F 1/187 |
| | | | 361/679.37 |
| 8,087,739 B2 * | 1/2012 | Chen | G11B 33/124 |
| | | | 70/379 R |
| 8,118,271 B2 * | 2/2012 | Peng | G06F 1/187 |
| | | | 248/221.11 |
| 8,154,863 B2 * | 4/2012 | Yang | G06F 1/187 |
| | | | 361/679.37 |
| 8,238,091 B2 | 8/2012 | Chang et al. | |
| 8,300,398 B2 * | 10/2012 | Zhang | G06F 1/187 |
| | | | 361/679.33 |
| 8,369,077 B2 * | 2/2013 | Peng | G11B 33/124 |
| | | | 361/679.33 |
| 8,369,080 B2 * | 2/2013 | Huang | G06F 1/187 |
| | | | 361/679.37 |
| 8,553,404 B2 * | 10/2013 | Lin | G11B 33/128 |
| | | | 361/679.33 |
| 8,638,550 B2 * | 1/2014 | Xia | H05K 7/1487 |
| | | | 361/679.33 |
| 8,675,355 B2 * | 3/2014 | Wallace | E05B 13/002 |
| | | | 361/679.33 |
| 8,743,536 B2 | 6/2014 | Alo et al. | |
| 8,767,387 B2 * | 7/2014 | Knight | H05K 5/0247 |
| | | | 361/679.01 |
| 9,253,914 B2 * | 2/2016 | Demange | H05K 7/1409 |
| 10,082,844 B2 * | 9/2018 | Yang | G11B 33/124 |
| 12,131,757 B2 * | 10/2024 | Lin | G11B 33/128 |
| 2007/0211422 A1 * | 9/2007 | Liu | G06F 1/187 |
| | | | 361/679.37 |
| 2010/0187957 A1 * | 7/2010 | Liang | G06F 1/187 |
| | | | 312/223.2 |
| 2010/0284145 A1 * | 11/2010 | Kang | G06F 1/187 |
| | | | 211/26 |
| 2010/0295427 A1 * | 11/2010 | Li | G06F 1/187 |
| | | | 312/223.2 |
| 2010/0302722 A1 * | 12/2010 | Kang | G06F 1/187 |
| | | | 361/679.31 |
| 2010/0321879 A1 * | 12/2010 | Peng | G11B 33/124 |
| | | | 361/679.33 |
| 2011/0074259 A1 * | 3/2011 | Chen | G11B 33/124 |
| | | | 312/223.2 |
| 2011/0101831 A1 * | 5/2011 | Wang | G06F 1/187 |
| | | | 312/223.1 |
| 2012/0097623 A1 * | 4/2012 | Zhang | G06F 1/187 |
| | | | 211/26 |

* cited by examiner

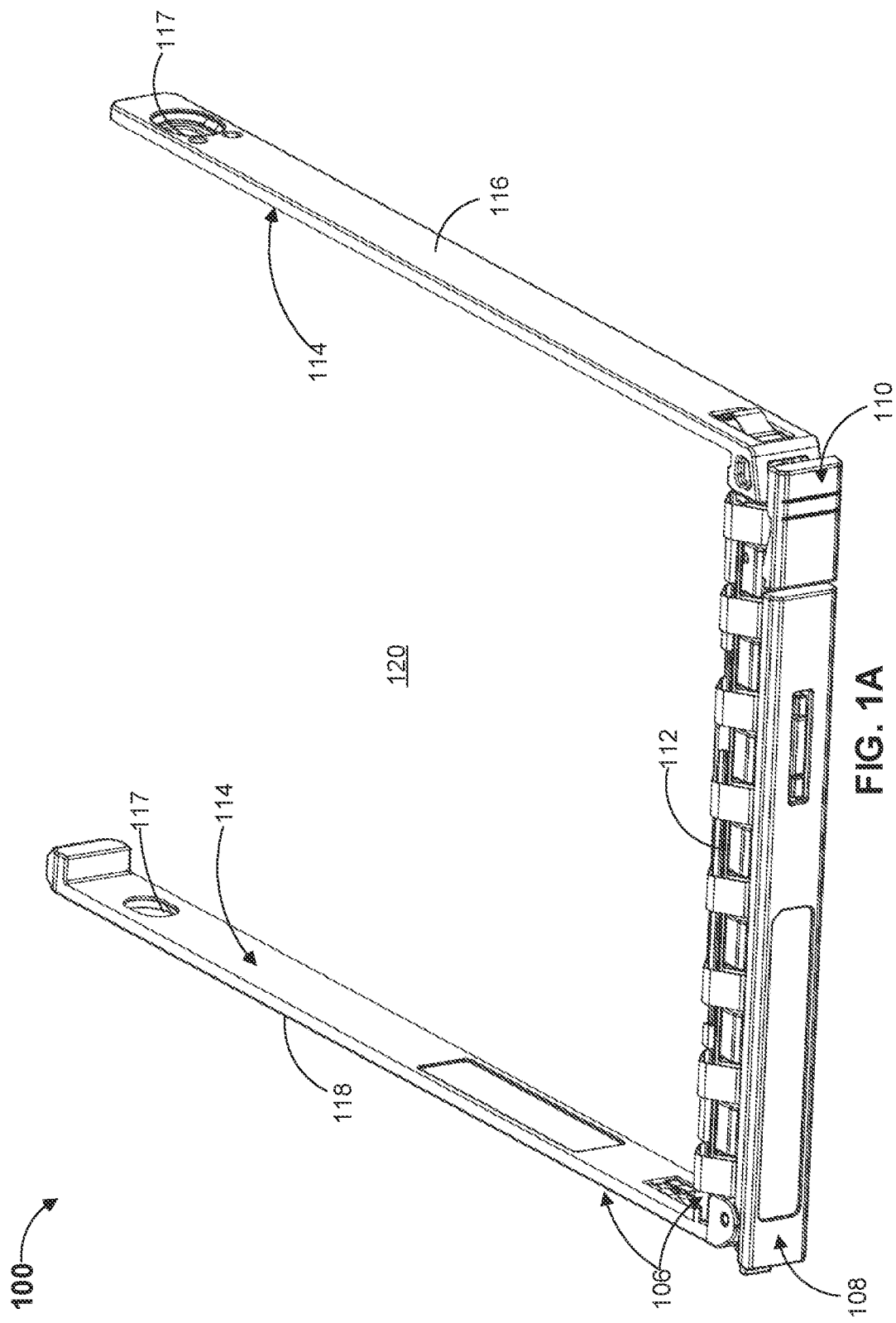

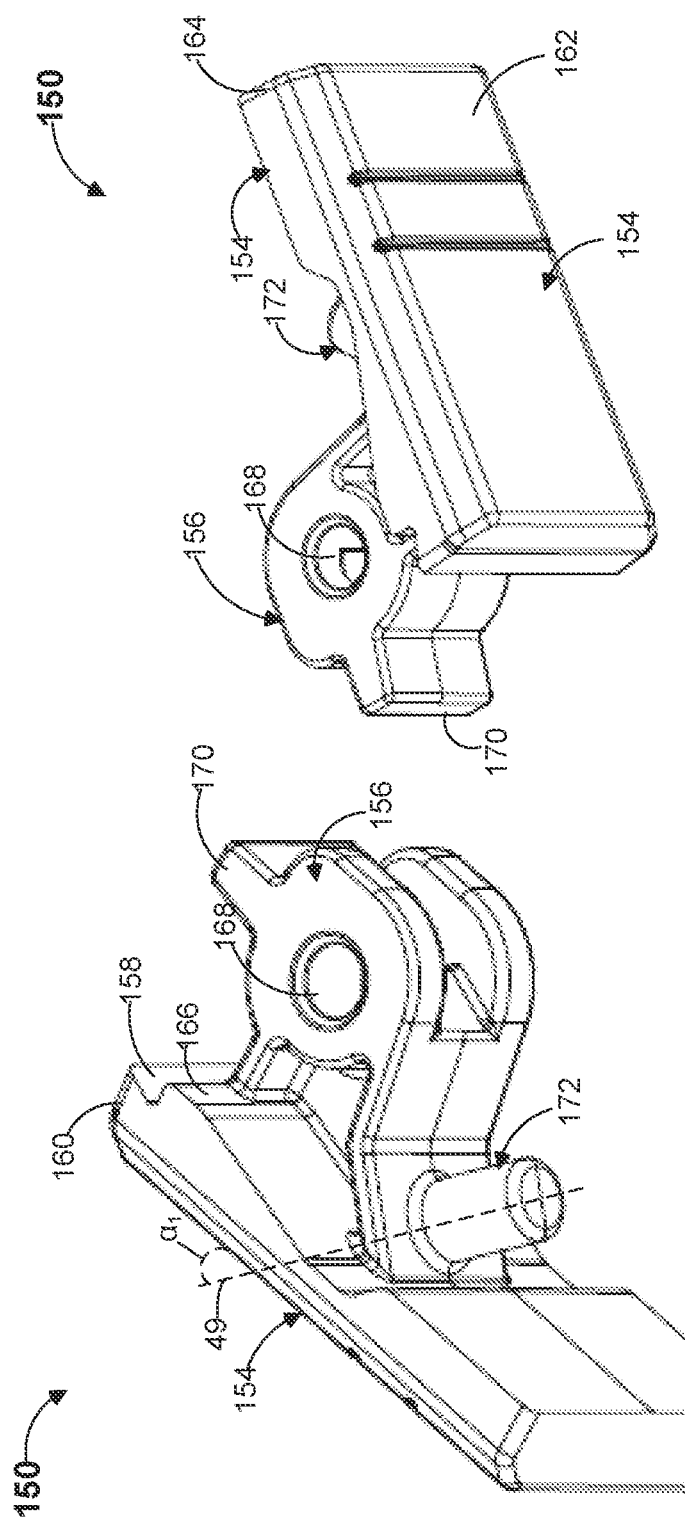

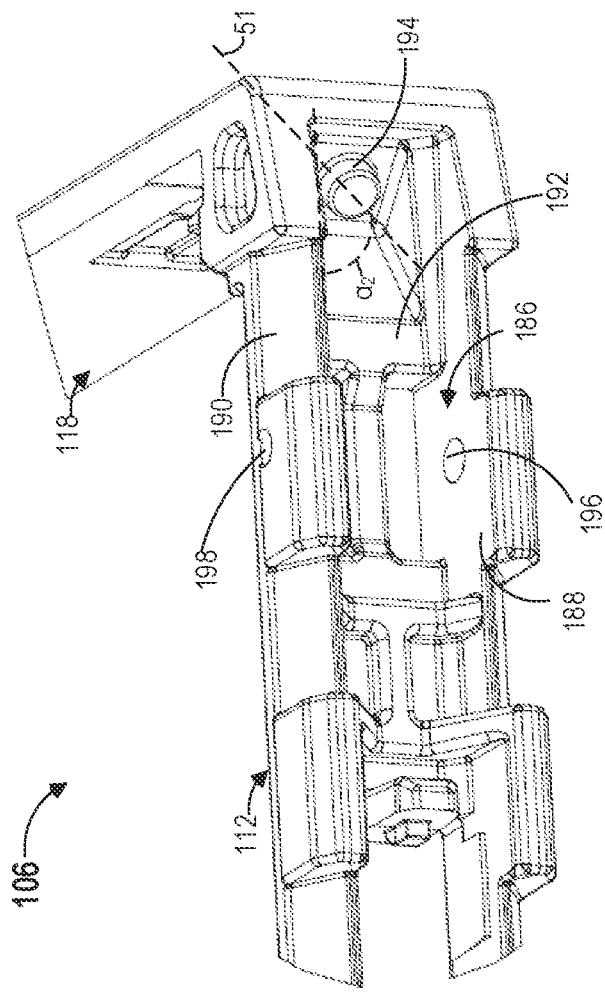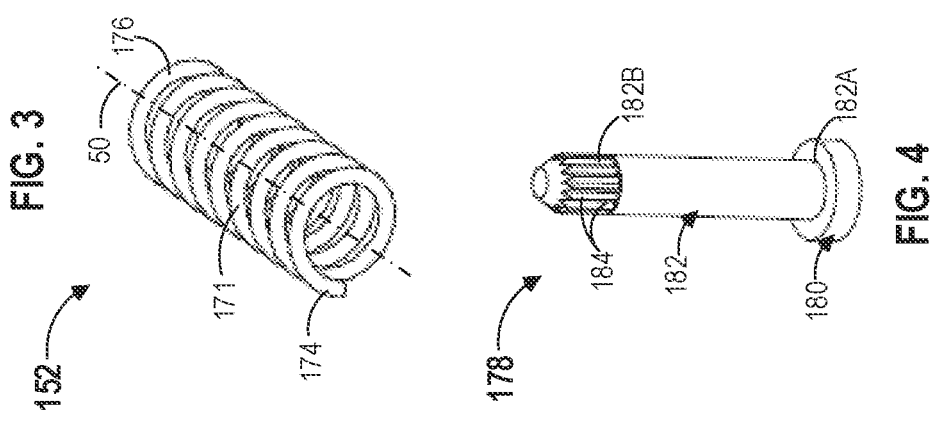

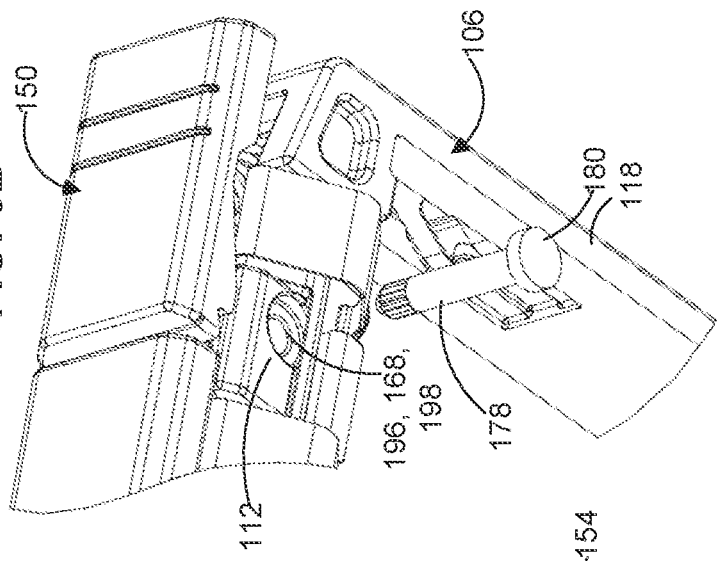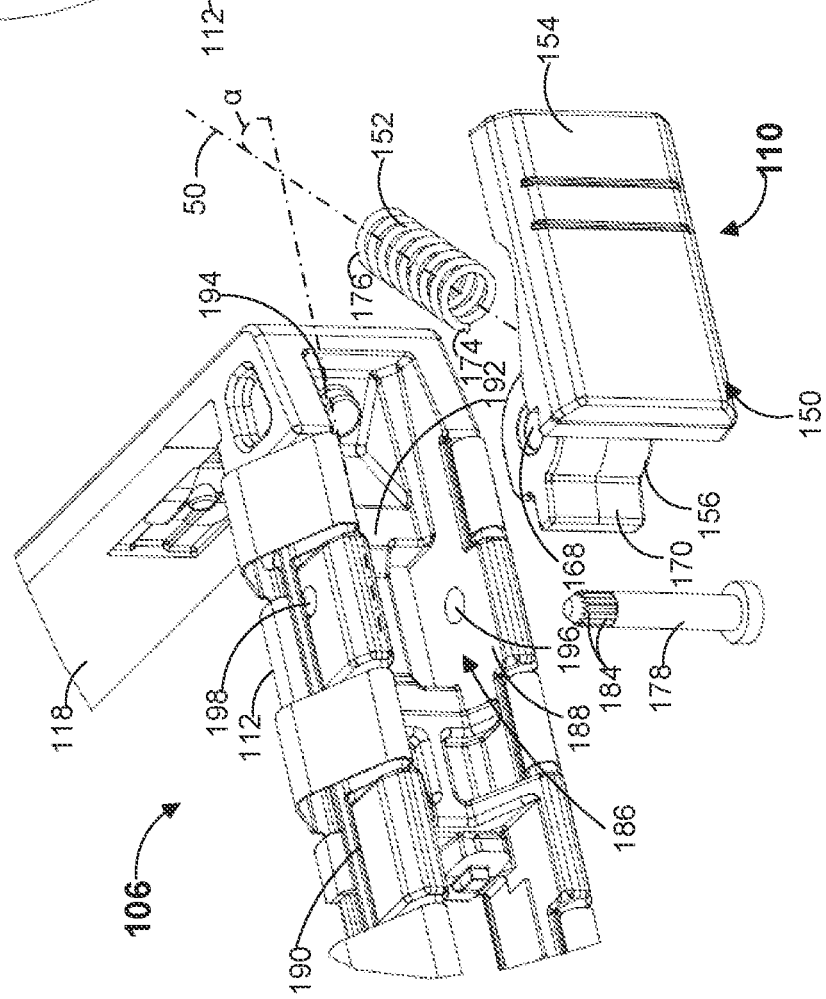

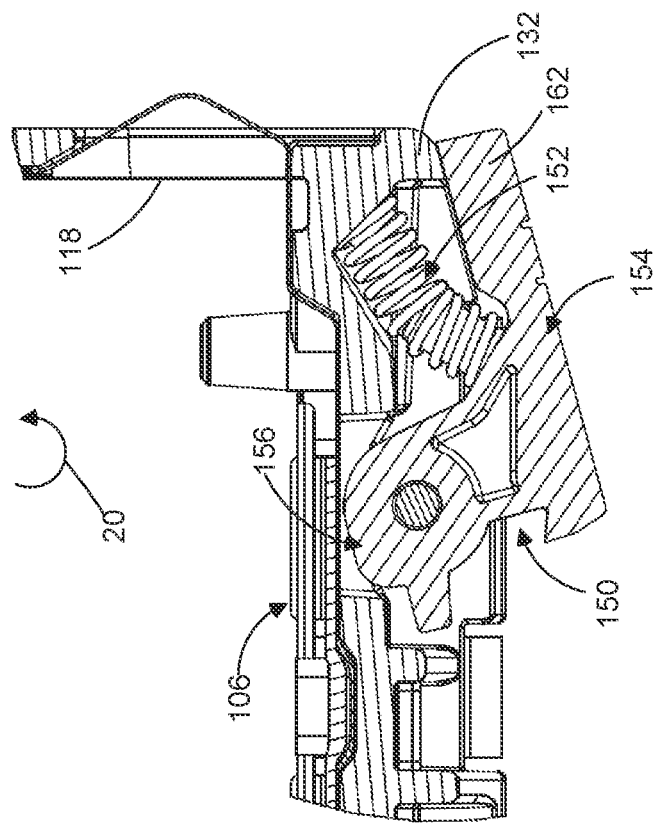
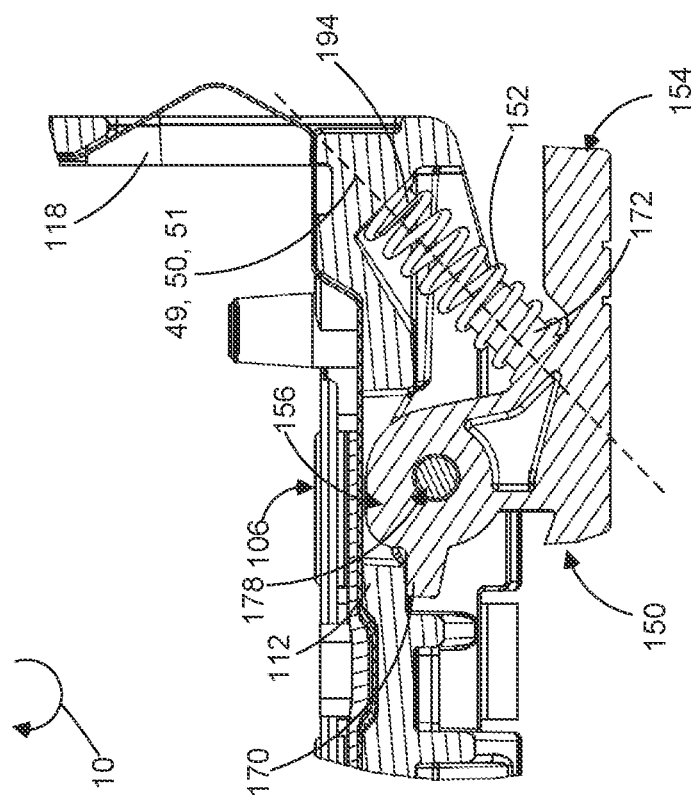

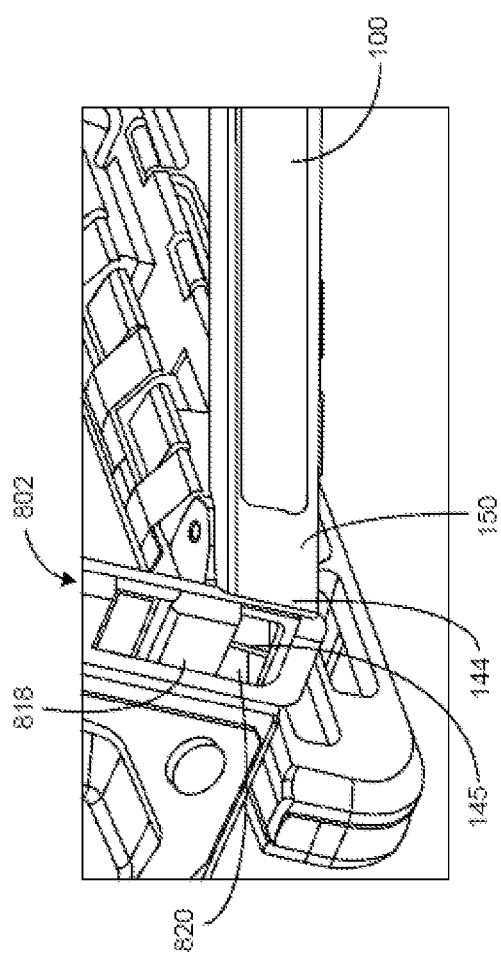

LATCHING ASSEMBLY FOR A HANDLE OF A DRIVE CARRIER

BACKGROUND

Electronic devices, such as a computing device may include one or more media drives, such as solid state drives ("SSDs"), hard disk drives ("HDDs"), CD ROM drives, or DVD drives. One or more receiving locations can be included in the chassis of the computing device for receiving those drives. The media drives can either be directly mounted within those receiving locations, or may be first received in a carrier, which is itself receivable in the receiving location. A drive carrier may be used, for example, in a computing device (e.g., a server, a high-performance-compute device, a data storage appliance, a converged or hyper converged system, or other computing devices) to facilitate installation and uninstallation (e.g., hot-swapping) of a media drive to the computing device. Further, a drive carrier may protect a media drive from being damaged during installation and uninstallation. In this manner, a drive carrier may be used to configure a media drive, such as an SSD, as a field replaceable unit (FRU) to make the media drive hot-pluggable.

BRIEF DESCRIPTION OF THE DRAWINGS

Various examples will be described below with reference to the following figures.

FIG. 1A illustrates a perspective view of a drive carrier having a frame, a handle assembly, and a latching assembly according to an example of the present disclosure.

FIG. 2A illustrates a perspective rear view of a latch of the latching assembly of FIGS. 1A-1B according to an example of the present disclosure.

FIG. 2B illustrates a perspective front view of the latch of the latching assembly of FIGS. 1A-1B according to an example of the present disclosure.

FIG. 3 illustrates a perspective view of a helical compression spring of the latching assembly of FIGS. 1A-1B according to an example of the present disclosure.

FIG. 4 illustrates a perspective view of a pin of the latching assembly of FIGS. 1A-1B according to an example of the present disclosure.

FIG. 5 illustrates a perspective view of a portion of the frame of FIGS. 1A-1B according to an example of the present disclosure.

FIG. 6A illustrates an exploded perspective view of a latching assembly and a frame according to an example of the present disclosure.

FIG. 6B illustrates a partially assembled perspective view of the latching assembly and the frame of FIG. 6A according to an example of the present disclosure.

FIG. 7A illustrates a cross-sectional view of a latching assembly in a latched position according to an example of the present disclosure.

FIG. 7B illustrates a cross-sectional view of a latching assembly in an unlatched position according to an example of the present disclosure.

FIG. 8B illustrates a first portion of the electronic device of FIG. 8A having a first end of a handle engaged with a frame of the drive cage according to an example of the present disclosure.

FIG. 8C illustrates a second portion of the electronic device of FIG. 8A having a second end of a handle engaged with a latch of a latching assembly according to an example of the present disclosure.

DETAILED DESCRIPTION

Figure 1B:
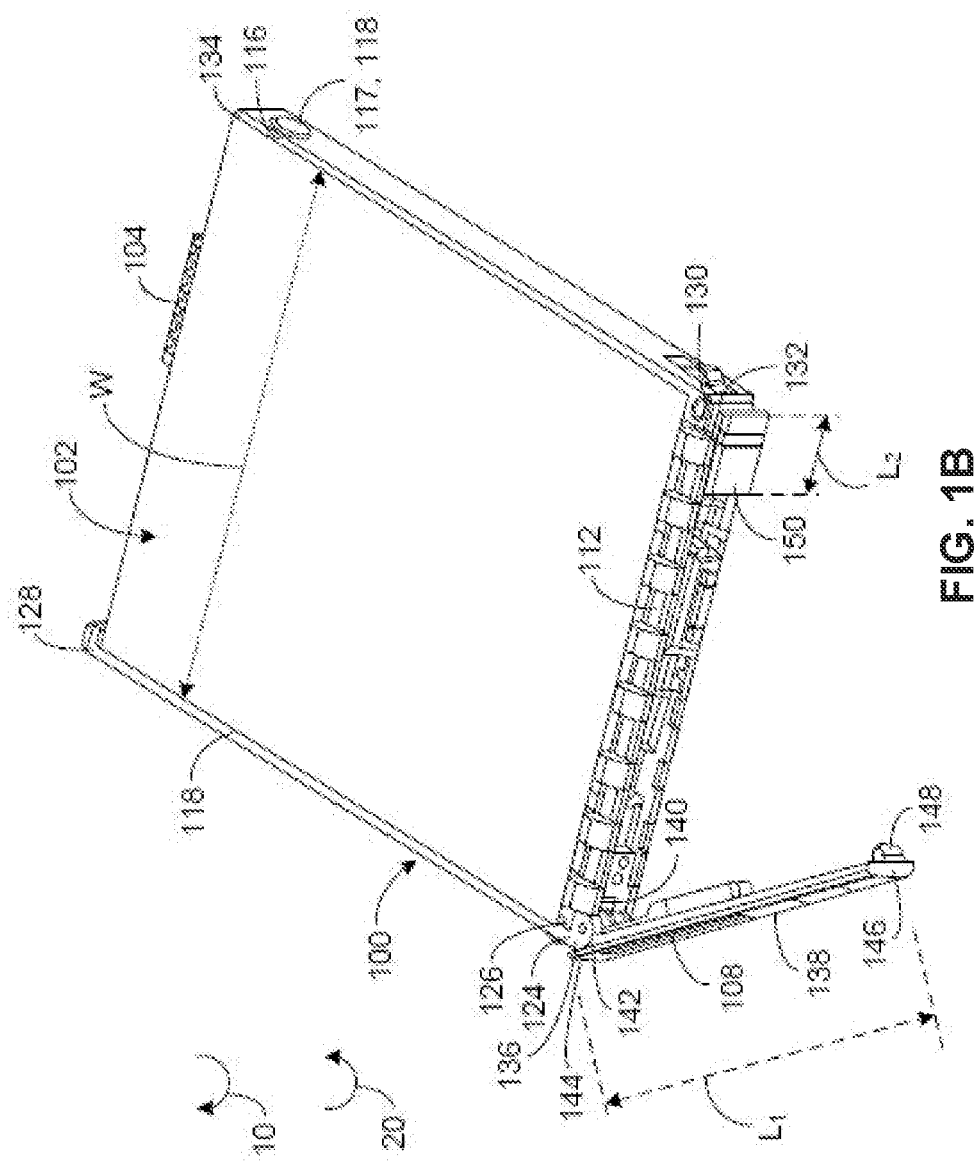
FIG. 1B illustrates a perspective view of the drive carrier of FIG. 1A and a media drive according to an example of the present disclosure.

The following detailed description refers to the accompanying drawings. For purposes of explanation, certain examples are described with reference to the components illustrated in FIGS. 1-9. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Drive carriers are used to configure media drives, such as SSDs, as FRUs, allowing the drives to be hot swapped into an electronic device. Drive carriers are therefore defined by the physical form of the SSD, or drive, which they are configured to carry and are standardized by an industry form factor (e.g., an SSD form factor). An Enterprise & Data Center Standard Form Factor (EDSFF), for example, is designed for use in data centers in servers with storage devices such as SSDs. As a form factor, it defines specifications such as the dimensions and electrical interfaces storage devices should have, to ensure data center operators, server manufacturers, and SSD manufacturers, can make products that work with products from multiple manufacturers. As used herein, an EDSFF drive therefore refers to a type of a media drive that has a form factor specified in one of the standards in the EDSFF family of standards, including, but not limited to, a form factor specified in SFF-TA-1006, SFF-TA-1007, or SFF-TA-1008, and an EDSFF drive carrier is a drive carrier configured to carry and support an EDSFF drive.

Due to the small size of emerging EDSFF technologies, drive carriers designed to support EDSFF drives (EDSFF drive carriers) are significantly smaller than those designed for previous drive technologies. Given the larger size of previous drive carriers, in the past, there was greater space (e.g., depth and height) available in a frame of such drive carrier that would allow: i) a handle of the drive carrier to connect with the frame and engage with a drive cage to hold the drive carrier in the drive cage, in a closed position of the handle, and ii) a latch of the drive carrier to connect with the frame and engage with the handle to retain the handle in its closed position. However, EDSFF drive carriers have less available space in a frame, and as a result, certain parts of the EDSFF drive carrier cannot properly function within such space constraints. For example, even when the latch of a drive carrier for previous drives technologies is miniaturized to fit in a limited available space of a frame of an EDSFF drive carrier, such latch does not function properly because the space constraint (e.g., limited depth and height) for the latch in the frame prevents the latch from properly retaining the handle in its closed position.

To address the challenges associated with small sized drive carriers, including EDSFF drive carriers, the present disclosure contemplates an improved drive carrier that allows a latching assembly to be disposed and function (e.g., secure a media drive therein) in the limited space of the frame. In particular, the latching assembly may include components, such as a latch and a helical compression spring that fits in the limited space of the frame and properly functions to retain a handle assembly in its closed position. For example, the latch may have a mounting section which may be disposed in the limited space of the frame, e.g., a channel of the frame, to pivotably connect the latch to the frame. Further, the helical compression spring may be arranged in the limited space such that its axis is aligned at an acute angle relative to the frame. In particular, a first end of the helical compression spring may be disposed to contact a first spring post extending from the latch and a second end of the helical compression spring may be disposed to contact a second spring post extending from the frame. In such examples, the front section may be disposed at a first acute angle relative to the front section and the second spring post may be disposed at a second acute angle relative to the frame. Accordingly, the first and second spring posts extending at the first and second acute angles may minimize the space required to dispose the helical compression spring in the frame. Further, since the helical compression spring applies force along its axis to bias the latch towards a latched position even when the helical compression spring is disposed at the acute angle relative to the frame, the helical compression spring may still be able to properly function in the limited space of the frame.

Furthermore, examples disclosed herein may utilize a handle assembly that includes a handle having a first locking arm. The handle may be pivotably connected to the frame and configured to rotate relative to the frame between an open position and a closed position. The handle assembly may be configured to, in the closed position, engage a drive cage of an electronic device and hold the drive carrier in the drive cage. In such examples, the helical compression spring may apply the force along the axis on the latch to bias the latch towards the latched position latch and cause a second locking arm of the latch to engage with the first locking arm and retain the handle in the closed position. Thus, the helical compression spring positioned at the acute angle may exert a maximum linear force and a minimum rotational force (torque) on the latch to rotate the latch about its pivot point to retain the handle assembly in its closed position. Further, the first and second spring posts may provide enough gap therebetween for the helical compression spring to function (e.g., expand and compress) to hold the latch in a proper position even under the stresses it experiences during use.

In some implementations, the latch may further include a front section having the second locking arm at one end and a protruding portion at an opposite end. The protruding portion may be pushed towards the frame to compress the helical compression spring and rotate the latch towards the unlatched position to disengage the second locking arm from the first locking arm. In such examples, when the second locking arm is disengaged from the first locking arm, the handle may be allowed to move from the closed position to the open position and release the drive carrier from the electronic device. In some examples, the protruding section may contact the frame when pushed towards the frame, to limit the latch to rotate about 10 degrees to 20 degrees to minimize the amount of angular rotation of the helical compression spring. Further, a stopper arm of the latch may contact the frame to prevent over rotation of the latch towards the frame by the force applied on the latch by the helical compression spring.

Referring to the Figures, FIG. 1A depicts a perspective view of a drive carrier 100. FIG. 1B depicts a perspective view of the drive carrier 100 and a media drive 102 received within the drive carrier 100. In the description hereinafter, FIGS. 1A-1B are described concurrently for ease of illustration. In some examples, the drive carrier 100 may be used to releasably install the media drive 102 to a drive bay of a drive cage (not shown) of an electronic device (e.g., a computing device), such that a connector 104 of the media drive 102 is detachably connected to another connector of an external electronic component, e.g., a backplane circuit board (not shown) of the electronic device.

The drive carrier 100 may include a frame 106, a handle assembly 108, and a latching assembly 110. The frame 106 is configured to receive and carry the media drive 102, including, but limited to an SSD. In one implementation, as described further below, the frame 106 is configured to receive and carry an EDSFF drive 102. In such implementation, the EDSFF drive 102 may have a width of about 76 mm, a thickness of about 7.5 mm thickness, and a length of about 112.75 mm, and the EDSFF drive carrier 100 may have matching (e.g., the same or similar) dimensions to that of the EDSFF drive 102 to receive and carry the EDSFF drive 102 therein. It should be understood, however, that FIGS. 1A and 1B are not intended to illustrate specific shapes, dimensions, or other structural details accurately or to scale, and that implementations of the drive carrier 100 may have different numbers and arrangements of the illustrated components and may also include other parts that are not illustrated. Furthermore, it should be understood that the disclosed drive carrier 100 may be used to carry various types and configurations of media drives, having different shapes, dimensions, and features, and is not intended to be restricted to a particular drive technology.

In some examples, the frame 106 includes a front rail 112, a pair of side rails 114, e.g., a first side rail 116 and a second side rail 118 which are disposed spaced apart from each other and connected to the front rail 112 to define a volume 120 of the drive carrier 100. In particular, the first side rail 116 includes a first end 124 connected to one end 126 of the front rail 112 and a second free end 128. Similarly, the second side rail 118 includes a third end 130 connected to another end portion 132 of the front rail 112 and a fourth free end 134. In such examples, the media drive 102 may be received within the volume 120 of the drive carrier 100 and coupled to the drive carrier 100. For example, each of the first and second side rails 116, 118 includes a first mounting hole 117 and each side walls (not labeled) of the media drive 102 includes a second mounting hole 119. In such examples, when the media drive 102 is received within the volume 120 of the drive carrier, the first and second screw holes are aligned to each other, thereby allowing a fastener (not shown) to extend through a corresponding first and second mounting holes 117, 118 to couple the media drive 102 to the pair of side walls 114 of the frame 106. In some examples, the first side rail 116 may further include a mounting block 136 disposed at its first end 124.

Figure 8A:
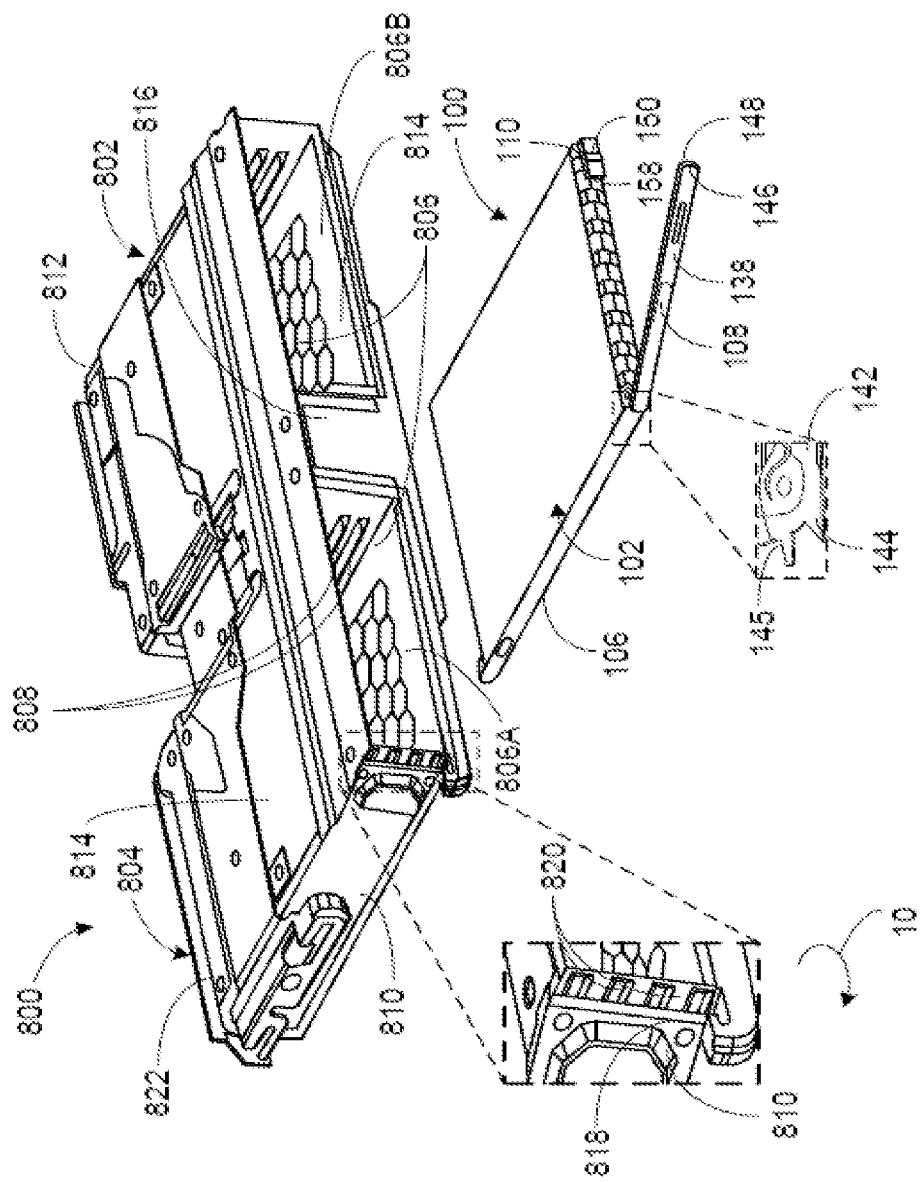
FIG. 8A illustrates an exploded perspective view of an electronic device having a drive carrier and a drive cage according to an example of the present disclosure.

The handle assembly 108 is used to engage with the drive cage and hold the drive carrier to the drive cage. The handle assembly 108 includes a handle 138 and a torsional spring 140. In some examples, a first end 142 of the handle 138 may be pivotably connected to the mounting block 136 of the first side rail 116. As used herein "pivotably connect" means to connect a first component to a second component in a manner, e.g., about a point, that allows the first component to rotate relative to the second component which is stationary. The first end 142 may additionally include a cam element 144 which may be configured to engage with a follower element (as shown in FIG. 8A-8B) of the drive cage and hold the drive carrier 100 in the drive cage. It may be noted that the cam element 144 and the follower element are discussed in greater details in the example of FIGS. 8A-8C. Further, a second end 146 of the handle 138 includes a first locking arm 148. In particular, the first locking arm 148 is disposed at a rear face of the handle 138. The handle 138 may have a length "$L_1$" which may be, for example, about 0.8 times a width "W" of the drive carrier 100. However, it is noted that the length of the handle 138 should not be limited to the aforementioned example. The torsional spring 140 is housed in the mounting block 136 of the first side rail 116 such that a first end (not labeled) of the torsional spring 140 contacts the front rail 112 and a second end (not labeled) of the torsional spring 140 contacts the handle 138. Further, the handle 138 is pivotally connected to the frame 106 to rotate relative to the frame 106 between an open position (as shown in FIG. 1B) and a closed position (as shown in FIG. 1A). In particular, the handle 138 is pivotably connected to the mounting block 136 disposed at the first end 124 of the first side rail 116. In such examples, the torsional spring 140 in an expanded (or relaxed) state may rotate the handle 138 along a clockwise direction 10 and retain the handle 138 in the open position. Similarly, the torsional spring 140 in a compressed (or biased) state may rotate the handle 138 along a counter clockwise direction 20 and move the handle 138 to the closed position. As used herein, "closed position" refers to a position of a handle, which is parallel to a front section of a frame and which is indicative of installation of a drive carrier to a drive cage of an electronic device. As used herein, "open position" refers to another position of the handle, which is inclined at an angle relative to the front section of the frame and which is indicative of release of the drive carrier from the drive cage.

The latching assembly 110 is used to retain the handle assembly 108 in the closed position. The latching assembly 110 includes a latch 150, a helical compression spring 152 (as shown in FIGS. 3 and 6A), and a pin 178 (as shown in FIG. 4). As used herein "latch" refers to a type of a mechanical fastener that connects two components to each other, while allowing for their regular separation. The latch 150 is pivotably connected to the frame 106 and rotatable between a latched position (as shown in FIG. 7A) and an unlatched position (as shown in FIG. 7B). The latch 150 may have a length "$L_2$" which may be, for example, about 0.2 times the width "W" of the drive carrier 100. However, it is noted that the length of the latch 150 should not be limited to the aforementioned example. In one or more examples, the latch 150 in the latched position is configured to retain the handle 138 in the closed position. For example, the helical compression spring 152 is configured to apply a force on the latch 150 to bias the latch 150 towards the latched position and retain the handle 138 in the closed position. In particular, the helical compression spring 152 in an expanded (or relaxed) state may rotate the latch 150 along the clockwise direction 10 to retain the handle 138 in its closed position. Similarly, the helical compression spring 152 in a compressed (or biased) state may rotate the latch 150 along the counter clockwise direction 20 and allow the handle 138 to move back to the open position. The latching assembly 110 and its functions are discussed in greater details below.

FIG. 2A depicts a perspective rear view of a latch 150 of the latching assembly 110 of FIGS. 1A-1B and FIG. 2B depicts a perspective front view of the latch 150 of the latching assembly 110 of FIGS. 1A-1B. In the description hereinafter, FIGS. 2A-2B are described concurrently for ease of illustration. It may be noted herein that the latch 150 may function as a button to retain the handle 138 in its closed position or release the handle 138 from its closed position. The latch 150 includes a front section 154, a mounting section 156, and a first spring post 172. In some examples, the front section 154 extends along a first direction 30 and includes a second locking arm 158 at one end 160 and a protruding portion 162 at an opposite end 164. The mounting section 156 extends along a second direction 40 from a rear face 166 of the front section 154. The mounting section 156 may pivotably couple the latch 150 to the front rail 112 of the frame 106. The mounting section 156 includes an aperture, e.g., a third aperture 168 and a stopper arm 170. The third aperture 168 may be used to pivotably couple the latch 150 to the frame 106. The stopper arm 170 extends along the first direction 30 and may be configured to contact the frame 106 to prevent over rotation of the latch 150 towards the frame 106 due to the force applied on the latch 150 from the helical compression spring 152. The mounting section 156 is disposed at the end 160 of the front section 154. In some examples, the second direction 40 is perpendicular to the first direction 30. In some other examples, the second direction 40 may be about 75 degrees to about 105 degrees. The first spring post 172 extends along a first axis 49 from a rear face 166 of the front section 154 at a first acute angle "$\alpha_1$" relative to the front section 154. The first spring post 172 may be engaged with a first end 174 (as shown in FIG. 3) of the helical compression spring 152.

FIG. 3 depicts a perspective view of a helical compression spring 152 of the latching assembly of FIGS. 1A-1B. The helical compression spring 152 may have a wire 171, which is wrapped to form coils that resemble a screw thread. The coils may extend along an axis 50 of the helical compression spring 152. The helical compression spring 152 has ends portions, e.g., a first end 174 and a second end 176 opposite to the first end 174.

FIG. 4 depicts a perspective view of a pin 178 of the latching assembly 110 of FIGS. 1A-1B. The pin 178 includes a head 180 and a body 182 connected to the head 180. In particular, a first portion 182A of the body 182 is connected to the head 180 and a second portion 182B of the body 182 includes a plurality of threads 184, e.g., knurls. The head 180 has a greater diameter in comparison with the body 182 of the pin 178. In one or more examples, the pin 178 may be configured to establish a pivot connection between the latch 150 and the frame 106.

FIG. 5 depicts a perspective view of a portion of the frame 106 of FIGS. 1A-1B. The portion of the frame 106 includes the front rail 112 and the second side rail 118. The front rail 112 includes a channel 186 defined by a bottom wall 188, a top wall 190, and a support wall 192 extending between the bottom wall 188 and the top wall 190. The support wall 192 includes a second spring post 194 extending along a second axis 51 at a second acute angle "α₂" relative to the support wall 192. The second spring post 194 may be engaged with the second end 176 of the helical compression spring 152. The bottom wall 188 may include a first aperture 196 and the top wall 190 may include a second aperture 198, which are aligned to each other.

FIG. 6A depicts an exploded perspective view of the portion of the frame 106 and the latching assembly 110 of FIGS. 1A-1B and FIG. 6B depicts a partially assembled perspective view of the latching assembly 110 and the portion of the frame 106 of FIGS. 1A-1B. In the description hereinafter, FIGS. 6A-6B are described concurrently for ease of illustration. The portion of the frame 106 includes the front rail 112 and the second side rail 118 connected to the front rail 112. The latching assembly 110 includes the latch 150, the helical compression spring 152, and the pin 178. The latch 150 includes the front section 154, the mounting section 156, and the first spring post 172 (as shown in FIG. 2A). The mounting section 156 includes the third aperture 168 and the stopper arm 170. The front rail 112 includes the channel 186 defined between the bottom wall 188, the top wall 190, and the support wall 192. The bottom wall 188 includes the first aperture 196 and the top wall 190 includes the second aperture 198. The support wall 192 includes a second spring post 194. The helical compression spring 152 is arranged such that an axis 50 thereof is disposed at an acute angle "α" relative to the front rail 112 of the frame 106 or relative to front section 154 of the latch 150.

In some examples, the first spring post 172 is engaged with the first end 174 of the helical compression spring 152. Further, the mounting section 156 having the helical compression spring 152, is disposed in the channel 186 such that the mounting section 156 is disposed between the bottom wall 188 and the top wall 190 and the first, second, and third apertures 196, 198, 168 respectively, are aligned with each other. In such examples, the second spring post 194 is engaged with the second end 176 of the helical compression spring 152. Further, the pin 178 is disposed in the first aperture 196, the second aperture 198, and the third aperture 168 to pivotably connect the latch 150 to the front rail 112 of the frame 106. In one or more examples, the pin 178 may extend from the third aperture 196 to the second aperture 198 via the third aperture 168 and engage with a plurality of counter threads (not shown), such as counter knurls, formed in the second aperture 198 releasably retain the pin 178 to the latch 150. In such examples, the head 180 of the pin contacts the bottom wall 188 of the front rail 112.

FIG. 7A depicts a cross-sectional view of the latching assembly 110 of FIGS. 1A-1B in a latched position and FIG. 7B depicts a cross-sectional view of the latching assembly 110 of FIGS. 1A-1B in an unlatched position. In the description hereinafter, FIGS. 7A-7B are described concurrently for ease of illustration. As discussed herein, the mounting section 156 of the latch 150 is pivotably connected to the front rail 112 of the frame 106 by the pin 178 extending along the first aperture 196, the second aperture 198, and the third aperture 168 (as labeled in FIG. 6B). The helical compression spring 152 is disposed at an acute angle "α" relative to the front section 154 of the latch 150 or the front rail 112 of the frame 106. In particular, the first spring post 172 being engaged with the first end 174 (as labeled in FIG. 3) of the helical compression spring 152 and the second spring post 194 being engaged with the second end 176 of the helical compression spring 152 allows the helical compression spring 152 to be positioned at the acute angle "α". The helical compression spring 152 in a relaxed state (expanded state) moves the latch 150 to the latched position (as shown in FIG. 7A). In such examples, the stopper arm 170 contacts the front rail 112 of the frame 106 to prevent over rotation of the latch 150 towards the frame 106 due to the force applied on the latch 150 along the axis 50 from the helical compression spring 152. In one or more examples, in the latched position of the latch 150, the first spring post 172 and the second spring post 194 extend along respective axes e.g., the first axis 49 and the second axis 51 that are aligned with each other and with the axis 50 of the helical compression spring 152. The helical compression spring 152 may rotate the latch 150 along the clockwise direction 10 to move the latch 150 to the latched position.

Referring to FIG. 7B, the protruded portion 162 of the front section 154 of the latch 150 may be pushed to rotate along the counter clockwise direction 20. In such examples, the helical compression spring 152 may be compressed to allow the latch to move to the unlatched position. In some examples, the protruding portion 162 contacts the other end portion 132 of the front rail 112 when pushed towards the frame 106. In some examples, the other end portion 132 may limit the latch 150 to rotate about 10 degrees to 20 degrees relative to the front rail 112 so as to prevent a rotational force (torque) on the helical compression spring 152.

Since the mounting section 156 is disposed in the limited space, e.g., the channel 186 of the front rail 112 to pivotably connect the latch 150 to the frame 106, and additionally since the helical compression spring 152 is arranged at an acute angle relative to the front rail 112 of the frame 106, the latching assembly 110 fits in a limited depth and height of the frame 106 and still function properly to move between the latched and unlatched positions.

Figure 8E:
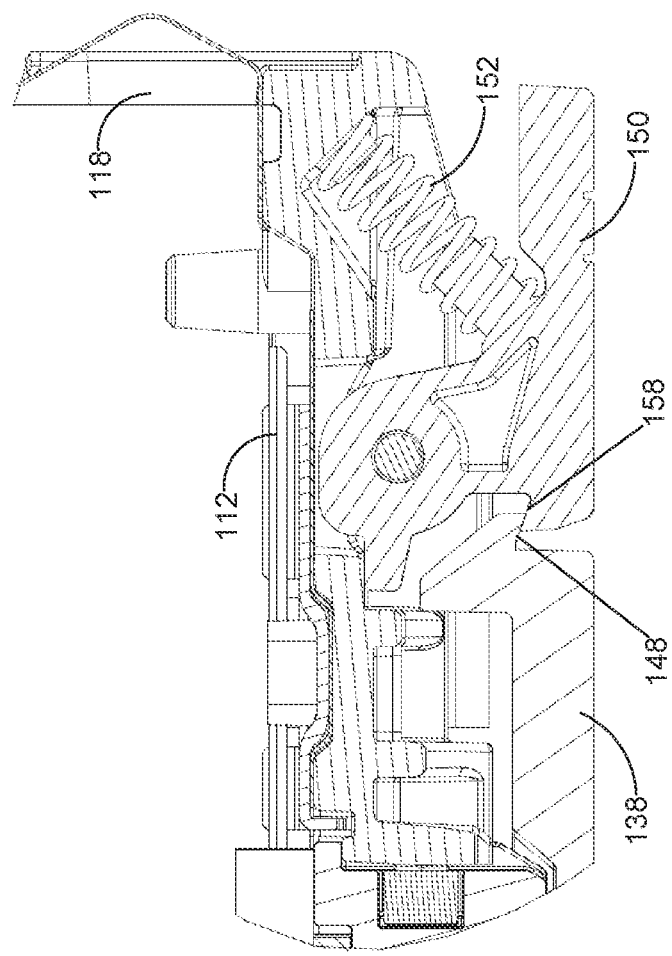
FIG. 8E illustrates a cross-sectional view of a latch retaining a handle in its closed position according to an example of the present disclosure.
Figure 8D:
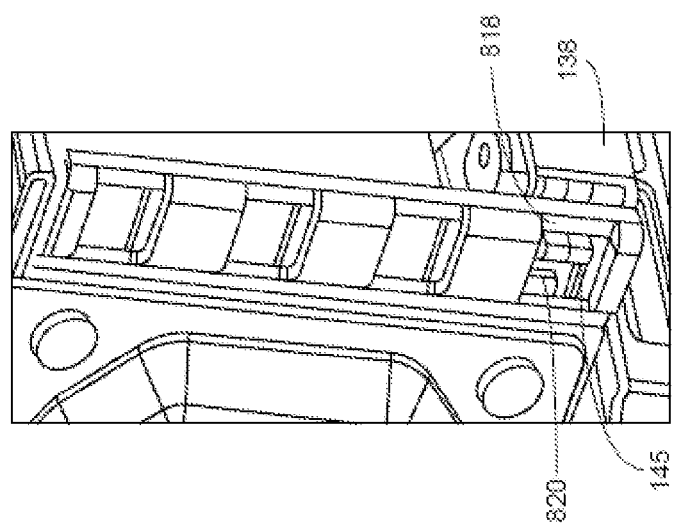
FIG. 8D illustrates an assembled perspective view of the electronic device of FIG. 8A according to an example of the present disclosure.

FIG. 8A depicts an exploded perspective view of an electronic device 800 having a drive carrier 100 and a drive cage 802. FIG. 8B depicts a first portion of the electronic device 800 of FIG. 8A having a first end of the handle assembly 108 of the drive carrier 100 engaged to the frame 106 of the drive cage 802. FIG. 8C depicts a second portion of the electronic device 800 of FIG. 8A having a second end of the handle assembly 108 of the drive carrier 100 engaged to the latching assembly 110 of the drive carrier 100. FIG. 8D depicts an assembled perspective view of the electronic device 800 of FIG. 8A. FIG. 8E depicts a cross-sectional view of the latch 150 of the latching assembly 110 retaining the handle 138 in a closed position of the handle assembly 108. In the description hereinafter, FIGS. 8A-8E are described concurrently for ease of illustration.

The electronic device 800 may be a computer (e.g., a server, a high-performance-compute system, a data storage appliance, a converged or hyper converged system, or other electronic devices). In the example of FIG. 8A, the electronic device 800 is a server. In some examples, the electronic device 800 includes a drive cage 802, a backplane circuit board 804, a drive carrier 100, and a media drive 102.

The drive cage 802 functions as a chassis of the electronic device 800, which may be configured to receive one or more drive carriers and electrically connect the one or more drive carriers to a primary system board (not shown, e.g., a motherboard) of the electronic device 800 via the backplane circuit board 804. In the example of FIG. 8, the drive cage 802 includes columns 806 e.g., a first column 806A and a second column 806B, and each of the multiple columns 806 has a plurality of drive bays 808. In such examples, each drive bay 808 may receive one drive carrier 100 having the media drive 102 carried by the frame 106 of the drive carrier 100. In some examples, the drive cage 802 includes a first wall 810 and a second wall 812, which are connected to each other by a pair of support walls 814. Further, the drive cage 802 may include a separator wall 816 to separate an internal volume of the drive cage 802 and form multiple columns 806 therein. In such examples, the first wall 810 may include a follower element 818 having a plurality of openings 820.

The backplane circuit board 804 may be disposed and coupled to a rear end 822 of the drive cage 802 and a primary connector (e.g., golden fingers, not shown) of the backplane circuit board 804 may be connected to another connector (not shown) of the primary system board to electrically connect the backplane circuit board 804 to the primary system board.

As discussed herein, the drive carrier 100 includes the frame 106, the handle assembly 108, and the latching assembly 110. The frame 106 is used to receive and carry the media drive 102. The handle assembly 108 is used to engage with the drive cage 802 and hold the drive carrier 100 in the drive cage 802, in the closed position of the handle 138. The latching assembly 110 includes the latch 150 which is used to retain the handle 138 in its closed position. In one or more examples, the handle assembly 108 is pivotably connected to the frame 106 and the torsional spring 140 (as shown in FIG. 1B) in the expanded state rotates the handle 138 in the clockwise direction 10 and retains the handle 138 in the open position. The first end 142 of the handle 138 includes the cam element 144 and a latching element 145, and the second end 146 of the handle 138 includes the first locking arm 148. Similarly, the latching assembly 110 is pivotably connected to the frame 106 and the helical compression spring 152 (as shown in FIG. 6A) in the expanded state rotates the latch 150 in the clockwise direction 10 and retains the handle 138 in the latched position. The latch 150 includes the second locking arm 158.

The drive carrier 100 which is disposed outside of the drive cage 802 is slidably disposed inside one of the plurality of drive bays 808. Referring to FIG. 8B, when the drive carrier 100 is inserted into the drive cage 802, the latching element 145 of the handle 138 is disposed inside one of the plurality of openings 820 formed in the follower element 818 and the cam element 144 contacts the follower element 818. In such examples, the cam element 144 follows the follower element 818 and cause the latch 150 to rotate along the counter clockwise direction 20, thereby compressing the torsional spring 140 and moving the handle 138 from the open position to closed position. Referring to FIG. 8C, in such examples, a first angled lead-in ramp 148A of the first locking arm 148 contacts a second angled lead-in ramp 158A of the second locking arm 158. The first and second angled lead-in ramps 148A, 158A have complementary angles to each other. When the drive carrier 100 moves further inside the drive cage 802, the first angled lead-in ramp 148A engages with the second angled lead-in ramp 158A and pushes the latch 150 to rotate in the counter clockwise direction 20, thereby compressing the helical compression spring 152 and moving the latch 150 from the latched position to the unlatched position.

Referring to FIGS. 8D-8E, when the drive carrier 100 is fully disposed in the drive cage 802, the latching element 145 of the handle 138 latches to the follower element 818 by extending the latching element 145 through the opening 820. In such examples, the handle 138 is rotated to the closed position. Further, when the drive carrier 100 is fully disposed in the drive cage 802 and the handle 138 is rotated to the closed position, the connector 104 of the media drive 102 is connected to another connector (not shown) of the backplane circuit board 804 to electrically connect the media drive 102 to the primary circuit board of the electronic device 800 via the backplane circuit board 804. In such examples, when the latch 150 is rotated to the unlatched position by the handle 138 rotating to the closed position, the first locking arm 148 moves past the second locking arm 158. When the first locking arm 148 moves past the second locking arm 158, the helical compression spring 152 expands and pushes the latch 150 to rotate back to the latched position. In such examples, when the handle rotates back to the latched position, the second locking arm 158 engages with the first locking arm 148 and retains the handle 138 in its closed position, thereby allowing the handle 138 to hold the drive carrier 100 in the drive cage 802.

Figure 9:
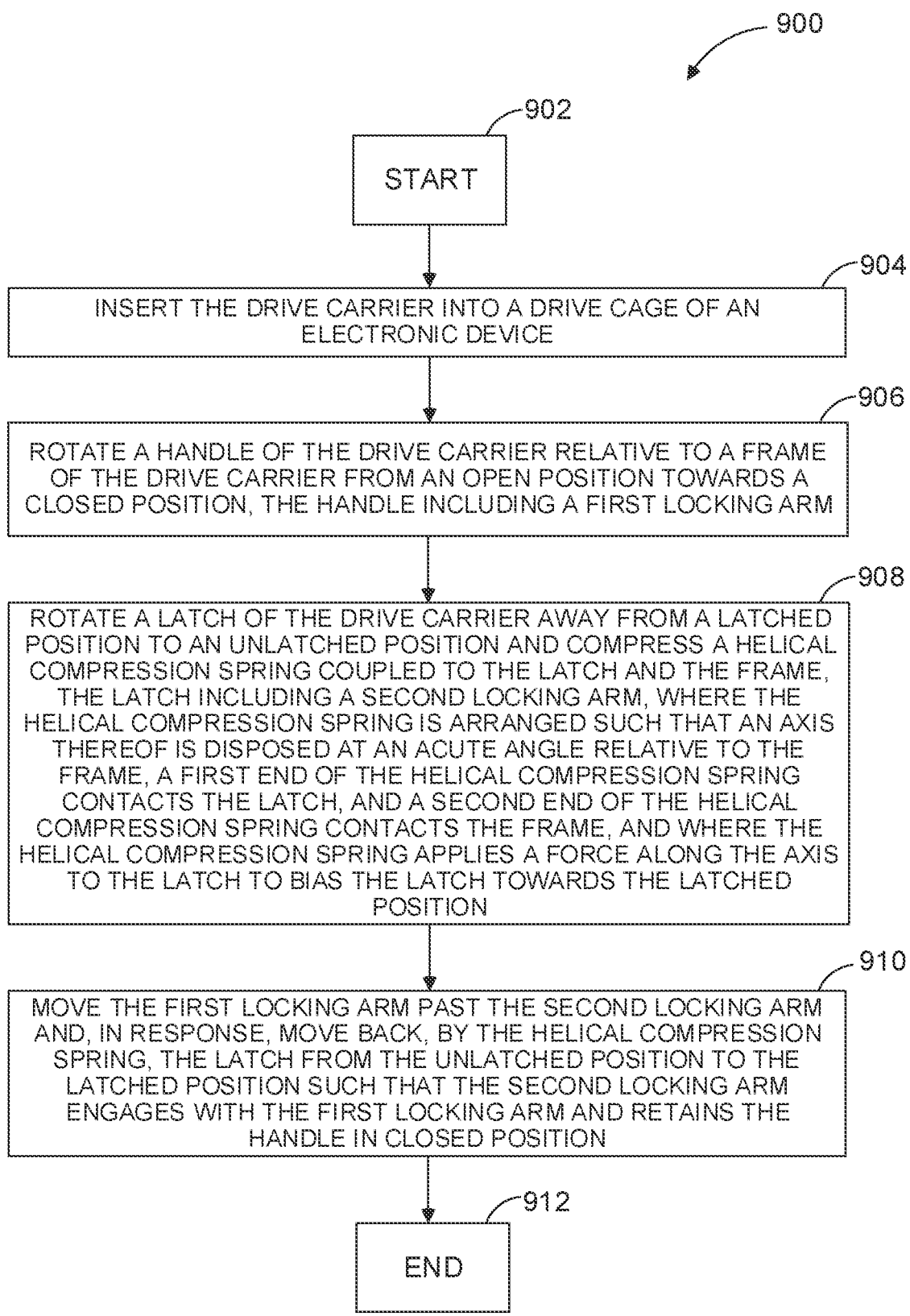
FIG. 9 is a flowchart depicting a method of using a drive carrier according to one example of the present disclosure.

FIG. 9 depicts a flowchart depicting a method 900 of using a drive carrier of an electronic device. It may be noted herein that the method 900 is described in conjunction with FIGS. 1A-1B, 2A-2B, 3-5, 6A-6B, 7A-B, and 8A-8D, for example. The method 900 starts at block 902 and continues to block 904.

At block 904, the method 900 includes inserting the drive carrier into a drive cage of an electronic device. The drive carrier carrying a drive is slidably inserted into a drive bay of the drive cage, where a handle assembly of the drive carrier is in an open position and the latch is in the latched position. The method 900 continues to block 906.

At block 906, the method 900 includes rotating a handle of the handle assembly relative to a frame of the drive carrier from the open position towards a closed position. In some examples, when the drive carrier is inserted into the drive bay, a cam element of the handle assembly contacts with a follower element of the drive bay and causes the handle to rotate from the open position to the closed position and compress a torsional spring of the handle assembly. The torsional spring applies force on the handle to bias the handle towards the open position. The handle includes a first locking arm. The method 900 continues to block 908.

At block 908, the method 900 includes rotating a latch of the latching assembly away from the latched position to an unlatched position and compressing a helical compression spring coupled to the latch and the frame. The latch includes a second locking arm. In some examples, the handle contacts the latch and causes the latch to rotate from the latched position to the unlatched positon. In particular, when the handle is rotated from the open position to the closed position, a first angled lead-in ramp of the first locking arm engages with a second angled lead-in ramp of the second locking arm, and causes the handle to rotate the latch to the unlatched position and move the first locking arm past the second locking arm. In one or more examples, the helical compression spring is arranged such that an axis thereof is disposed at an acute angle relative to the frame, a first end of the helical compression spring contacts the latch, and a second end of the helical compression spring contacts the frame. The helical compression spring applies a force along the axis to the latch to bias the latch towards the latched position. The method 900 continues to block 910.

At block 910, the method 900 includes moving the first locking arm past the second locking arm and, in response, moving back, by the helical compression spring, the latch from the unlatched position to the latched position such that the second locking arm engages with the first locking arm and retains the handle in closed position. In particular, when the first locking arm moves past the second locking arm, the helical compression spring expands and pushes the latch to rotate back to the latched position. In such examples, when the handle rotates back to the latched position, the second locking arm engages with the first locking arm and retains the handle in its closed position, thereby allowing the handle to hold the drive carrier in the drive cage of the electronic device. The method 900 ends at block 912.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A drive carrier comprising:
a frame to receive and carry a media drive;
a handle assembly comprising a handle having a first locking arm, wherein the handle is pivotably connected to the frame and configured to rotate relative to the frame between an open position and a closed position, and wherein the handle assembly is configured to, in the closed position and in a state of the drive carrier inserted in a drive cage of an electronic device, engage the drive cage and hold the drive carrier in the drive cage; and
a latching assembly comprising:
a latch pivotably connected to the frame and rotatable between a latched position and an unlatched position, wherein the latch comprises a second locking arm and in the latched position the second locking arm is engageable with the first locking arm to retain the handle in the closed position; and
a helical compression spring arranged such that an axis thereof is disposed at an acute angle relative to the frame, a first end of the helical compression spring contacts the latch, and a second end of the helical compression spring contacts the frame, and wherein the helical compression spring applies a force along the axis on the latch to bias the latch towards the latched position.

2. The drive carrier of claim 1, wherein the latch comprises a front section and a mounting section, wherein the front section extends along a first direction and comprises the second locking arm at one end and a protruding portion at an opposite end, and the mounting section extends along a second direction from a rear face of the front section, and wherein the mounting section of the latch pivotably couples the latch to the frame.

3. The drive carrier of claim 2, wherein the mounting section of the latch further comprises a stopper arm configured to contact the frame to prevent over rotation of the latch towards the frame due to the force applied on the latch along the axis from the helical compression spring.

4. The drive carrier of claim 2, wherein the latch further comprises a first spring post extending from the rear face of the front section at a first acute angle relative to the front section, the first spring post being engaged with the first end of the helical compression spring.

5. The drive carrier of claim 4, wherein the frame comprises a channel defined by a bottom wall, a top wall, and a support wall extending between the bottom wall and the top wall, and wherein the support wall comprises a second spring post extending at a second acute angle relative to the support wall, the second spring post being engaged with the second end of the helical compression spring.

6. The drive carrier of claim 5, wherein the first spring post and the second spring post extend along respective axes that are aligned with each other and with the axis of the helical compression spring in the latched position of the latch.

7. The drive carrier of claim 2, wherein the frame comprises a channel defined by a bottom wall, a top wall, and a support wall extending between the bottom wall and the top wall, wherein the bottom wall has a first aperture and the top wall has a second aperture, wherein the mounting section having a third aperture is disposed in the channel between the top wall and the bottom wall such that the first, second, and third apertures are aligned with each other, and wherein the latching assembly further comprises a pin disposed in the first, second, and third apertures to pivotably connect the latch to the frame.

8. The drive carrier of claim 2, wherein the protruding portion is configured to be pushed towards the frame to compress the helical compression spring and rotate the latch to the unlatched position to disengage the second locking arm from the first locking arm and allow the handle to be moved from the closed position to the open position and release the drive carrier from the drive cage of the electronic device.

9. The drive carrier of claim 2, wherein the first locking arm of the handle has a first angled lead-in ramp and the second locking arm of the latch has a second angled lead-in ramp, wherein the first and second angled lead-in ramps have complementary angles to each other, and wherein the first and second angled lead-in ramps are configured to engage with each other, when the handle is being moved toward the closed position, and cause the handle to rotate the latch towards the unlatched position and move the first locking arm past the second locking arm.

10. An electronic device comprising:
a drive cage; and
a drive carrier inserted in the drive cage, wherein the drive carrier comprises:
a frame to receive and carry a media drive;
a handle assembly comprising a handle having a first locking arm, wherein the handle is pivotably connected to the frame, and configured to rotate relative to the frame between an open position and a closed position, and wherein the handle assembly is configured to, in the closed position, engage the drive cage and hold the drive carrier in the drive cage; and
a latching assembly comprising:
a latch pivotably connected to the frame and rotatable between a latched position and an unlatched position, wherein the latch comprises a second locking arm and in the latched position the second locking arm is engageable with the first locking arm to retain the handle in the closed position; and
a helical compression spring arranged such that an axis thereof is disposed at an acute angle relative to the frame, a first end of the helical compression spring contacts the latch, and a second end of the helical compression spring contacts the frame, and wherein the helical compression spring applies a force along the axis on the latch to bias the latch towards the latched position.

11. The electronic device of claim 10, wherein the latch comprises a front section and a mounting section, wherein the front section extends along a first direction and comprises the second locking arm at one end and a protruding portion at an opposite end, and the mounting section extends along a second direction from a rear face of the front section, and wherein the mounting section of the latch pivotably couples the latch to the frame.

12. The electronic device of claim 11, wherein the mounting section of the latch further comprises a stopper arm configured to contact the frame to prevent over rotation of the latch towards the frame due to the force applied on the latch along the axis from the helical compression spring.

13. The electronic device of claim 11, wherein the latch further comprises a first spring post extending from the rear face of the front section at a first acute angle relative to the front section, the first spring post being engaged with the first end of the helical compression spring.

14. The electronic device of claim 13, wherein the frame comprises a channel defined by a bottom wall, a top wall, and a support wall extending between the bottom wall and the top wall, and wherein the support wall comprises a second spring post extending at a second acute angle relative to the support wall, the second spring post being engaged with the second end of the helical compression spring.

15. The electronic device of claim 14, wherein the first spring post and the second spring post extend along respective axes that are aligned with each other and with the axis of the helical compression spring in the latched position of the latch.

16. The electronic device of claim 11, wherein the frame comprises a channel defined by a bottom wall, a top wall, and a support wall extending between the bottom wall and the top wall, wherein the bottom wall has a first aperture and the top wall has a second aperture, wherein the mounting section having a third aperture is disposed in the channel between the top wall and the bottom wall such that the first, second, and third apertures are aligned with each other, and wherein the latching assembly further comprises a pin disposed in the first, second, and third apertures to pivotably connect the latch to the frame.

17. The electronic device of claim 11, wherein the protruding portion is configured to be pushed towards the frame to compress the helical compression spring and rotate the latch to the unlatched position to disengage the second locking arm from the first locking arm and allow the handle to be moved from the closed position to the open position and release the drive carrier from the drive cage of the electronic device.

18. The electronic device of claim 11, wherein the first locking arm of the handle has a first angled lead-in ramp and the second locking arm of the latch has a second angled lead-in ramp, wherein the first and second angled lead-in ramps have complementary angles to each other, wherein the first and second angled lead-in ramps are configured to engage with each other, when the handle is being moved toward the closed position, and cause the handle to rotate the latch towards the unlatched position and move the first locking arm past the second locking arm.

* * * * *